(12) United States Patent
Bhat et al.

(10) Patent No.: US 11,502,582 B2
(45) Date of Patent: Nov. 15, 2022

(54) SPRING CLAMP FOR FITTING ONTO AN ELECTRICAL CONDUCTOR OF AN ELECTRIC MACHINE

(71) Applicant: Vitesco Technologies GMBH, Hannover (DE)

(72) Inventors: Uday Bhat, Roding (DE); Frank Eltner, Berlin (DE); Zoran Dmitrasinovic, Berlin (DE); Anton Beer, Roding (DE); Johannes Kohlstrunk, Berlin (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 296 days.

(21) Appl. No.: 16/901,264

(22) Filed: Jun. 15, 2020

(65) Prior Publication Data

US 2020/0313316 A1  Oct. 1, 2020

Related U.S. Application Data

(63) Continuation of application No. PCT/EP2018/082735, filed on Nov. 27, 2018.

(30) Foreign Application Priority Data

Dec. 13, 2017 (DE) ...................... 10 2017 222 543.2

(51) Int. Cl.
*H02K 11/25* (2016.01)
*H01R 4/48* (2006.01)
*H02K 3/50* (2006.01)

(52) U.S. Cl.
CPC ........... *H02K 11/25* (2016.01); *H01R 4/4809* (2013.01); *H02K 3/50* (2013.01)

(58) Field of Classification Search
CPC .......... G01K 1/143; H02K 3/50; H02K 11/25; H01R 4/4809; H01R 4/28; H01R 4/48
(Continued)

(56) References Cited

U.S. PATENT DOCUMENTS 8,800,542 B1  8/2014  Kennington
8,841,804 B2  9/2014  Maekawa et al.
(Continued)

FOREIGN PATENT DOCUMENTS

CA   2559291 A1   3/2007
CN   1965230 A    5/2007
(Continued)

OTHER PUBLICATIONS

Bromberger et al, Stator Assembly for an Electric Machine and Electric Machine, Dec. 27, 2018, DE 102017210433 (English Machine Translation) (Year: 2018).*
(Continued)

*Primary Examiner* — Alexander A Singh

(57) ABSTRACT

A spring clamp for plugging onto an electrical conductor of an electric machine, having a first spring leg and a second spring leg adjoining the first spring leg. The spring legs are arranged and/or formed with respect to one another in such a way that a receiving opening for receiving the electrical conductor is formed between a free first end portion of the first spring leg and a free second end portion of the second spring leg, and the conductor is clamped between the first end portion and the second end portion. The second spring leg has a sensor holder and a spring arm with a press-on tab, a spring force is exerted by way of the spring arm such that a sensor arranged in the sensor holder is fixed in the sensor holder by way of the press-on tab, and the sensor holder is pressed onto the electrical conductor.

12 Claims, 2 Drawing Sheets

(58) Field of Classification Search
USPC .............................................. 310/68 C, 68 R
See application file for complete search history.

(56) References Cited

U.S. PATENT DOCUMENTS

| | | | |
|---|---|---|---|
| 9,234,257 | B2 | 1/2016 | Takahata et al. |
| 2015/0155760 | A1 | 6/2015 | Bessho et al. |
| 2017/0200538 | A1 | 7/2017 | Mitchell et al. |

FOREIGN PATENT DOCUMENTS

| | | | |
|---|---|---|---|
| CN | 102468713 | A | 5/2012 |
| CN | 102536769 | A | 7/2012 |
| CN | 104113165 | A | 10/2014 |
| DE | 3817080 | A1 | 12/1988 |
| DE | 102014223353 | A1 | 5/2016 |
| DE | 102016119430 | A1 | 4/2018 |
| DE | 102017210433 | A1 | 12/2018 |
| EP | 0727864 | A1 | 8/1996 |
| JP | 2011254628 | | 12/1988 |
| JP | 2014111833 | A | 6/2014 |
| WO | 2005034152 | A2 | 4/2005 |
| WO | 2016190198 | A1 | 12/2016 |

OTHER PUBLICATIONS

German Office Action dated Aug. 1, 2019 for corresponding German Patent Application No. 10 2017 222 543.2.
International Search Report and Written Opinion dated Feb. 13, 2019 from corresponding International Patent Application No. PCT/EP2018/082735.
Chinese Notice of Allowance dated May 11, 2022 for corresponding Chinese Application No. 201880076304.2.

* cited by examiner

SPRING CLAMP FOR FITTING ONTO AN ELECTRICAL CONDUCTOR OF AN ELECTRIC MACHINE

CROSS-REFERENCE TO RELATED APPLICATIONS

This application claims priority to PCT Application PCT/EP2018/082735, filed Nov. 27, 2018, which claims priority to German Patent Application No. DE 10 2017 222 543.2, filed Dec. 13, 2017. The disclosures of the above applications are incorporated herein by reference.

FIELD OF THE INVENTION

The invention relates to a spring clamp for plugging onto an electrical conductor of an electric machine, wherein the spring clamp has a sensor holder for receiving a temperature sensor and has a spring arm, wherein the temperature sensor is fixed in the sensor holder by way of the spring arm, and the sensor holder is pressed onto the electrical conductor. In addition, the invention relates to the use of the spring clamp according to the invention for arranging on an electrical conductor of an electric machine. Furthermore, the invention relates to an electric machine having a stator, wherein the stator has at least one electrical conductor, and the spring clamp according to the invention is arranged on the electrical conductor.

BACKGROUND OF THE INVENTION

Electric machines, such as starter generators, having a stator, wherein the stator has at least one electrical conductor, are generally known. Furthermore, it is known that temperatures of up to 180° C. may occur during operation of the electric machine. For secure operation of the electric machine, it is therefore essential to detect the exact temperature within the electric machine. It is further known that very high temperatures are measured on the neutral conductor. The temperatures within the electric machine are therefore as a rule detected on the neutral conductor.

There is a regular need to optimize the arrangement of the temperature sensor on an electrical conductor of the electric machine in order to reliably detect the temperatures within the electrical machine during operation.

SUMMARY OF THE INVENTION

It is the object of the invention to provide a spring clamp for arranging on an electrical conductor of an electric machine, by which a temperature sensor is fastened to the electrical conductor in a positionally secure and simple manner.

The object is achieved by the subject matter of the present invention. Advantageous embodiments of the invention are also described, with it being possible for each feature, both individually and in combination, to constitute an aspect of the invention.

According to the invention, a spring clamp for plugging onto an electrical conductor of an electric machine is provided, having a first spring leg and a second spring leg adjoining the first spring leg, wherein the first spring leg and the second spring leg are arranged and/or formed with respect to one another in such a way that a receiving opening for receiving an electrical conductor is formed between a free first end portion of the first spring leg and a free second end portion of the second spring leg, and the conductor is clamped between the first end portion and the second end portion, the second spring leg has a sensor holder and a spring arm with a press-on tab, and a spring force is exerted by way of the spring arm such that a sensor which is and/or may be arranged in the sensor holder is fixed in the sensor holder by way of the press-on tab, and the sensor holder is pressed onto the electrical conductor.

In other words, one aspect of the present invention is to provide a spring clamp which has a first spring leg and a second spring leg adjoining the first spring leg. Consequently, a spring clamp having a first and a second spring leg is specified. Here, the first spring leg and the second spring leg are arranged with respect to one another in such a way that a receiving opening is formed between a free first end portion of the first spring leg and a free second end portion of the second spring leg. A conductor end of an electrical conductor, which is customarily a neutral conductor, is guided through the receiving opening, with the electrical conductor being clamped between the respective first end portion and the second end portion. In this way, the spring clamp is arranged on the electrical conductor in a positionally secure and/or self-adjusting manner. The second spring leg has a sensor holder and a spring arm with a press-on tab. The sensor holder is preferably designed and formed to receive a sensor, such as a temperature sensor. A spring force is exerted by way of the spring arm such that the sensor arranged in the sensor holder is fixed in the sensor holder in a positionally secure manner by way of the press-on tab. The sensor holder in turn is pressed onto the electrical conductor. For this purpose, the sensor holder is designed to be resilient, with it also being conceivable that the sensor is pressed onto the sensor holder by way of the spring force of the spring arm, and in addition the sensor holder is pressed onto the electrical conductor. There is thus provided a spring clamp which is plugged in a simple manner onto the electrical conductor and is clamped thereto in a self-adjusting manner. Furthermore, a temperature sensor is positioned positionally securely in the sensor holder in a self-adjusting manner by way of the spring arm and is pressed onto the electrical conductor such that the temperature sensor is connected to the electrical conductor in a positionally secure manner and/or may be applied thereto.

It is not absolutely necessary here that the temperature sensor is connected and/or applied to the electrical conductor directly, or directly at least in certain portions. Therefore, the sensor holder may be formed between the temperature sensor and the electrical conductor at least in certain portions.

The term "self-adjusting" is to be understood as meaning that the clamping force of the spring clamp and/or the spring force of the spring arm are/is formed in such a way that preferably a temperature fluctuation-induced cross-sectional variation in the electrical conductor inserted into the spring clamp is compensated for by way of the clamping force of the spring clamp, and secure positioning of the spring clamp on the electrical conductor is ensured, or compensation of the spring force of the spring arm occurs, with the result that the sensor is fixed in the sensor holder in a positionally secure manner and is securely pressed onto the electrical conductor.

In a preferred development of the invention, the sensor holder is arranged and/or formed between the second end portion of the second spring leg and the transition region between the first spring leg and the second spring leg. Accordingly, the sensor holder is formed directly in the second spring leg.

In an advantageous development, there is provision that the sensor holder is U-shaped in form, wherein the upright arms of the U-shaped sensor holder face away from the second end portion of the second spring leg. In other words, the upright arms of the U-shaped sensor holder extend in the direction of the plug-in direction of the electrical conductor into the receiving opening of the spring clamp. The temperature sensor may preferably be arranged at least in certain portions on the upright arms of the U-shaped sensor holder.

In this connection, a preferred development of the invention consists in the end regions of the upright arms of the U-shaped sensor holder being upturned and/or folded. The term "upturning" and/or "folding" is to be understood as meaning a bending-over of the end regions of the upright arms. Here, the end regions are preferably bent off in a direction perpendicular to the plug-in direction of the electrical conductor into the spring clamp. The bent-up end regions thus constitute a stop for the temperature sensor such that the latter has a stop at least in one direction.

In an advantageous development of the invention, the spring arm is attached and/or formed in the transition region between the first spring leg and the second spring leg. The spring arm is fastened at this transition region by a spring arm end spaced apart from the spring tab.

In principle, the spring force of the spring arm is oriented in such a way that the temperature sensor which is arranged in the sensor holder is fixed in the sensor holder in a positionally secure manner. In a preferred development of the invention, the spring force of the spring arm acts in a direction perpendicular to the plug-in direction of the electrical conductor through the receiving opening. The U-shaped sensor holder is oriented at least in certain portions parallel to the plug-in direction of the electrical conductor through the receiving opening. A temperature sensor arranged in the sensor holder is pressed onto the sensor holder by way of the spring arm, and the sensor holder is applied to the electrical conductor. In this way, self-adjusting fixing of the temperature sensor to the electrical conductor is provided by way of the spring arm.

In an advantageous development of the invention, there is provision that the second end portion of the second spring leg is attached to the first spring leg by way of two longitudinal struts arranged spaced apart from one another. Therefore, the second spring leg has the two longitudinal struts, with a first longitudinal strut end being attached to the first spring leg in the transition region between the second spring leg and the first spring leg, and a second longitudinal strut end being connected to the second end portion. The longitudinal struts are bent in such a way that they are designed to be resilient. In this way, a clamping action of the free end portions with respect to one another may be brought about, with the result that the electrical conductor is clamped between the first end portion and the second end portion.

In this connection, a preferred development of the invention provides that the spring arm and/or the sensor holder are/is formed between the two longitudinal struts.

An advantageous development of the invention provides that the spring clamp is formed in one piece. In this way, it is possible to produce a very robust spring clamp which, moreover, is produced inexpensively.

In principle, it is conceivable that such a spring clamp may be produced from a plastic or from a metallic material. There may be provision here that the spring clamp is produced by an additive manufacturing method. A spring clamp consisting of a plastic may preferably be produced by an injection-molding method. In one embodiment of the invention, the spring clamp is formed as a stamped and bent part. In this way, the spring clamp is produced inexpensively and in large numbers in a simple manner. If the spring clamp is formed as a stamped and bent part, the clamp is formed from a metallic material and/or contains a metallic material.

A metallic material has the advantage that it may conduct the temperature very well such that, for reliable temperature detection of the electrical conductor inserted into the spring clamp, it is not absolutely necessary for the temperature sensor to directly adjoin the electrical conductor. Accordingly, the sensor holder may also be formed between the temperature sensor and the electrical conductor.

The invention additionally relates to the use of the spring clamp according to the invention on an electrical conductor of an electric machine, wherein the spring clamp is plugged by way of the receiving opening onto a conductor end of the electrical conductor and is clamped thereto, with the result that the conductor end is arranged between the first spring leg and the second spring leg at least in certain portions, a temperature sensor is arranged in the sensor holder, and the sensor holder is pressed onto the electrical conductor.

In other words, one aspect of the use of the spring clamp according to the invention is that the spring clamp is plugged onto a conductor end of the electrical conductor, wherein the conductor end is guided through the receiving opening of the spring clamp, and the conductor end is or may be clamped between the first end portion and the second end portion. A temperature sensor is arranged in the sensor holder of the second spring leg in order to detect the temperature of the electrical conductor or of the conductor end. The temperature sensor is pressed onto the sensor holder by way of the spring arm. The sensor holder in turn is pressed onto the electrical conductor, with the result that the temperature sensor may detect the temperature of the electrical conductor. The fact that the spring clamp is clamped onto the conductor end or is clamped with the conductor end allows self-adjusting fixing of the spring clamp on the conductor end to be provided. The temperature sensor is pressed onto the conductor end by way of the spring arm such that the temperature sensor is also in contact with the conductor end in a self-adjusting manner, with the result that the sensor is connected to the conductor end in a positionally secure manner in such a way that the temperature of the conductor end may be detected.

Finally, the invention relates to an electric machine having a stator, wherein the stator has at least one electrical conductor, the spring clamp according to the invention is plugged on a conductor end of the electrical conductor and is clamped to the conductor end, a temperature sensor is arranged in the sensor holder and fixed in the sensor holder by way of the spring arm, and the sensor holder is pressed onto the electrical conductor.

An electric machine is preferably understood to be a starter generator, such as a 48-volt belt starter generator.

Further features and advantages of the invention will emerge from the dependent claims and the following exemplary embodiments. The exemplary embodiments are to be understood not as restrictive, but rather as examples. They are intended to enable a person skilled in the art to carry out the invention. The applicant reserves the right to make one or more of the features disclosed in the exemplary embodiments the subject of patent claims or to include such features in existing patent claims.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention

BRIEF DESCRIPTION OF THE DRAWINGS

The exemplary embodiments are explained in more detail on the basis of figures, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
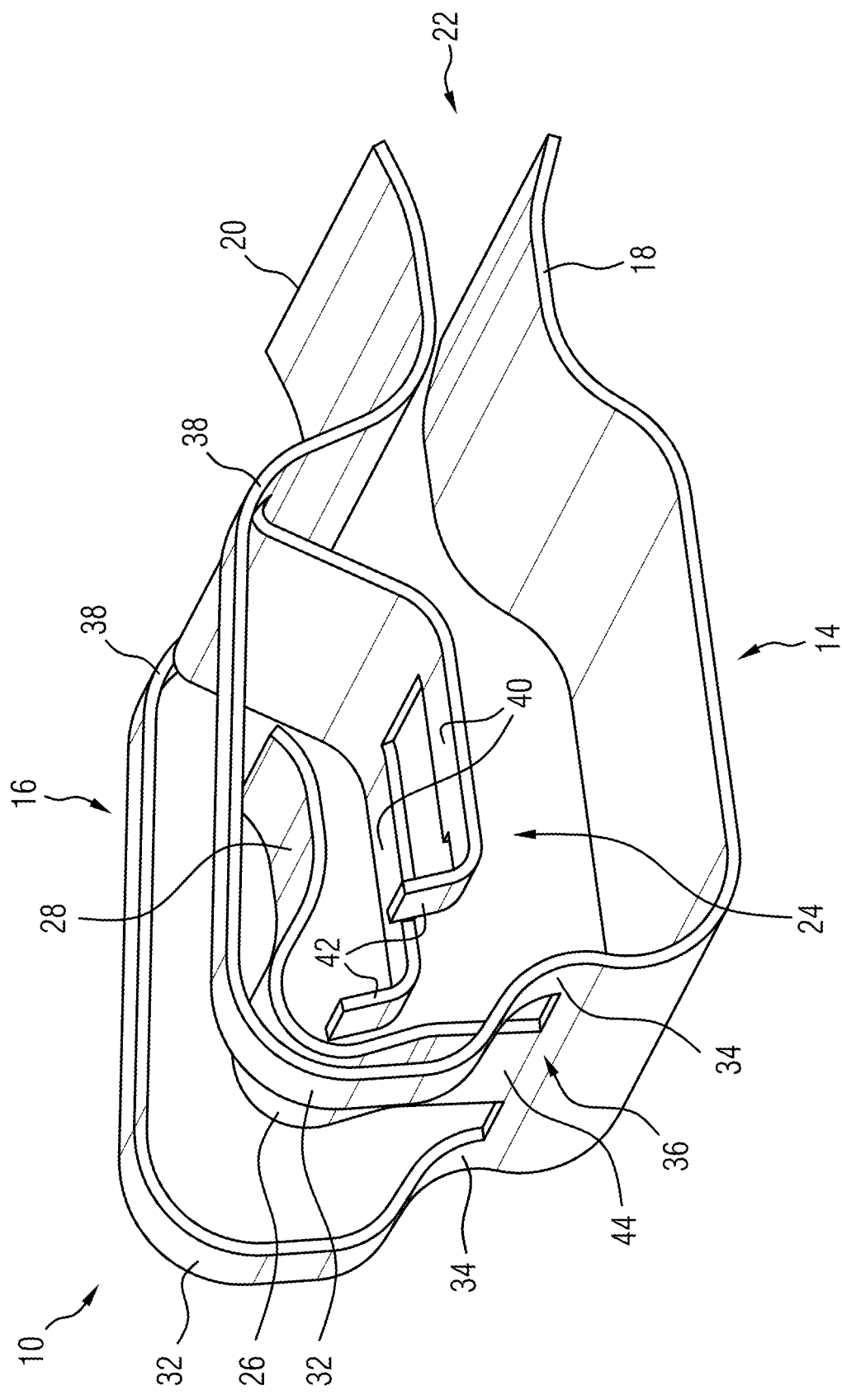
FIG. 1 shows a three-dimensional view of the spring clamp.

FIG. 1 shows a spring clamp 10 for plugging onto an electrical conductor 12 of an electric machine. The spring clamp 10 has a first spring leg 14 and a second spring leg 16 adjoining the first spring leg 14. The first spring leg 14 and the second spring leg 16 thus adjoin one another. Here, the first spring leg 14 and the second spring leg 16 are arranged and formed with respect to one another in such a way that a receiving opening 22 for receiving the electrical conductor 12 is formed between a free first end portion 18 of the first spring leg 14 and a free second end portion 20 of the second spring leg 16. Here, the electrical conductor 12 (FIG. 2) is clamped between the first end portion 18 and the second end portion 20, with the result that the spring clamp is fastened or fixed to the conductor end 46 of the electrical conductor 12 in a positionally secure and self-adjusting manner.

The second spring leg 16 includes a sensor holder 24 and a spring arm 26 with a press-on tab 28, wherein a spring force is exerted by way of the spring arm 26 such that a sensor 30, such as a temperature sensor, arranged in the sensor holder 24 is fixed in the sensor holder 24 by way of the press-on tab 28. The sensor holder 24 is pressed onto the electrical conductor 12, with the result that the sensor holder 24 bears against the electrical conductor 12 at least in certain portions. It is possible in this way to establish a contact between the temperature sensor 30 and the electrical conductor 12 in order to detect the temperature of the electrical conductor 12. By virtue of the fact that the temperature sensor 30 is fixed in the sensor holder 24 in a self-adjusting manner by way of the spring arm 26, and the sensor holder 24 is pressed onto the electrical conductor 12, self-adjusting fastening of the temperature sensor 30 to the electrical conductor 12 is provided by way of the spring clamp 10.

The second end portion 20 of the second spring leg 16 is attached to the first spring leg 14 by way of two longitudinal struts 32 arranged spaced apart from one another. A first longitudinal strut end 34 is attached to the first spring leg 14 in the transition region 36 between the first spring leg 14 and the second spring leg 16. A second longitudinal strut end 38 is connected to the second end portion 20. The second spring leg 16 is designed to be resilient by way of the longitudinal struts 32, with the result that the electrical conductor 12, which is plugged in or inserted through the receiving opening 22, is clamped between the first end portion 18 and the second end portion 20.

The sensor holder 24 is arranged between the second end portion 20 and the transition region 36. The sensor holder 24 has a U-shaped configuration, with the upright arms 40 of the U-shaped sensor holder 24 facing away from the second end portion 20 of the second spring leg 16. The upright arms 40 of the U-shaped sensor holder 24 extend in the longitudinal direction of the electrical conductor 12. Here, the upright arms 40 extend at least in certain portions parallel to the longitudinal direction of the electrical conductor 12 or parallel to the plug-in direction of the electrical conductor 12 through the receiving opening 22. A contact with the electrical conductor 12 may thus be established at least in certain portions by way of the upright arms 40. Moreover, the upright arms 40 serve both as a support and/or receptacle for the temperature sensor 30.

The end regions 42 of the upright arms 40 of the U-shaped sensor holder 24 are upturned or folded. The end regions 42 are bent over. The end regions 42 are bent over in a direction substantially perpendicular to the plug-in direction of the electrical conductor 12 into the spring clamp 10. It is possible in this way for the end regions 42 to position the temperature sensor 30 arranged in the sensor holder 24 in a positionally secure manner at least in one direction.

The spring arm 26 is attached in the transition region 36 between the first spring leg 14 and the second spring leg 16. The spring arm 26 is attached to the first spring leg 14 by a spring arm end 44 in the transition region 36. The spring force of the spring arm 26 acts in a direction perpendicular to the plug-in direction of the electrical conductor 12 through the receiving opening 22. At the same time that the spring force of the spring arm 26 acts in a direction perpendicular to the longitudinal direction of the electrical conductor 12. The spring arm 26 and the sensor holder 24 are formed between the two longitudinal struts 32.

In the present exemplary embodiment, the spring clamp 10 is formed in one piece and, moreover, as a stamped and bent part, with the spring clamp 10 additionally containing a metallic material. It is possible in this way for the spring clamp 10 to be produced inexpensively in large numbers.

Figure 2:
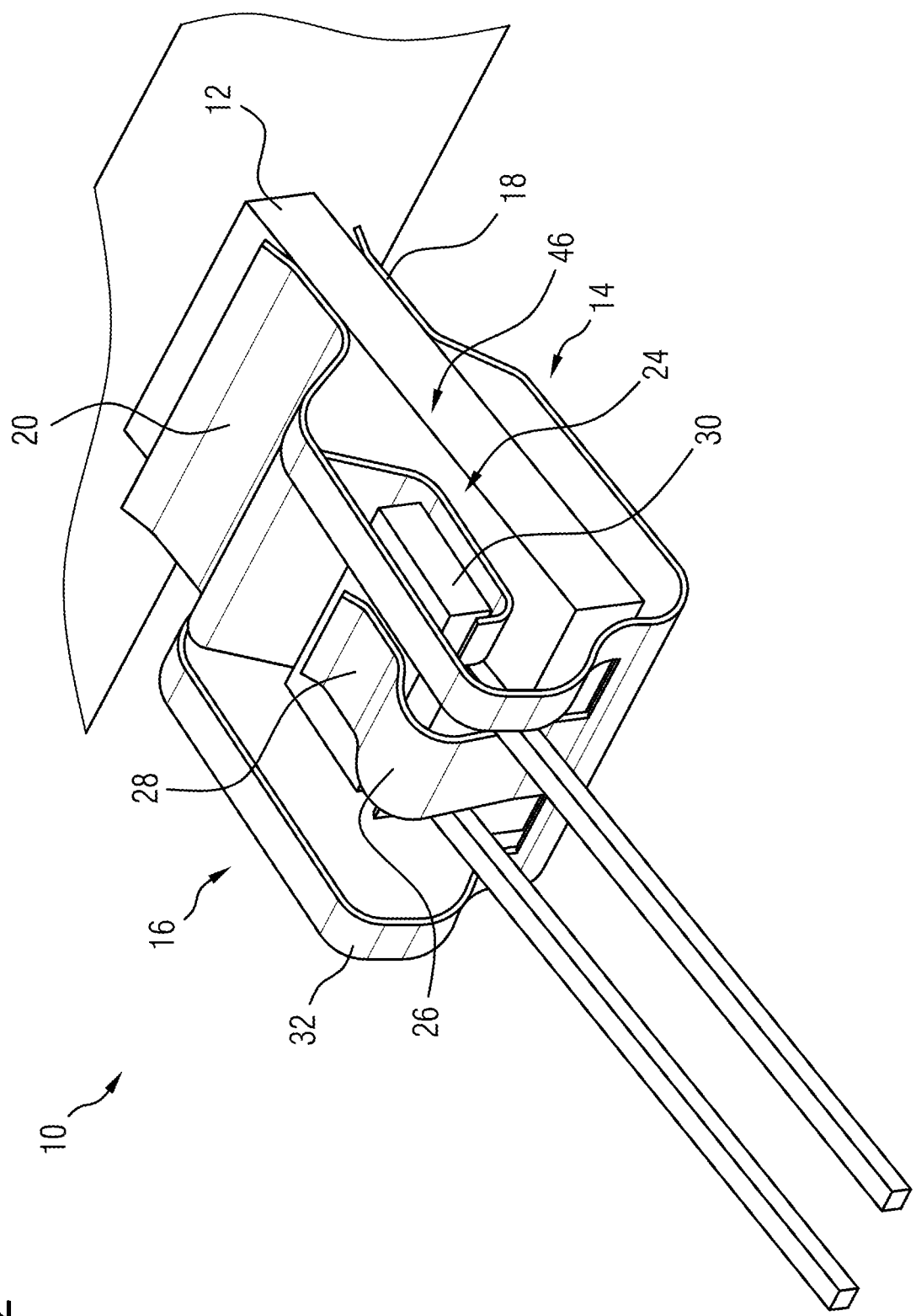
FIG. 2 shows a three-dimensional view of the spring clamp, the spring clamp having been plugged onto an electrical conductor, and a temperature sensor being arranged in a sensor holder of the spring clamp.

FIG. 2 shows the spring clamp 10 known from FIG. 1, with the spring clamp 10 having been plugged onto the electrical conductor 12. Here, a conductor end 46 engages through the receiving opening 22 such that the conductor end 46 is arranged between the first spring leg 14 and the second spring leg 16. The temperature sensor 30 is arranged in the sensor holder 24 and is fixed in the sensor holder 24 in a positionally secure manner by way of the spring arm 26. The sensor holder 24 is pressed onto the electrical conductor 12 or onto the conductor end 46 of the electrical conductor 12. Here, the spring force of the spring arm 26 acts in a direction perpendicular to the longitudinal direction of the electrical conductor 12 or in a direction perpendicular to the plug-in direction of the electrical conductor 12 into the spring clamp 10. In this way there is provided a spring clamp 10 which is produced inexpensively and which may be plugged onto the electrical conductor 12 in a simple manner and may connect the temperature sensor 30 to the electrical conductor 12 in a simple manner, with the result that reliable temperature detection of the electrical conductor 12 is made possible.

The description of the invention is merely exemplary in nature and, thus, variations that do not depart from the gist of the invention are intended to be within the scope of the invention. Such variations are not to be regarded as a departure from the spirit and scope of the invention.

LIST OF REFERENCE SIGNS 10 spring clamp
12 electrical conductor 14 first spring leg
16 second spring leg
18 first end portion
20 second end portion
22 receiving opening
24 sensor holder
26 spring arm
28 press-on tab
30 sensor/temperature sensor
32 longitudinal struts
34 first longitudinal strut end
36 transition region
38 second longitudinal strut end
40 upright arms
42 end region
44 spring arm end
46 conductor end

What is claimed is:

1. A spring clamp for plugging onto an electrical conductor of an electric machine, comprising:
a first spring leg;
a free first end portion integrally formed as part of the first spring leg;
a second spring leg adjoining the first spring leg;
a free second end portion integrally formed as part of the second spring leg;
a receiving opening for receiving the electrical conductor, and the first spring leg and the second spring leg are arranged with respect to one another in such a way that the receiving opening is formed between the free first end portion and the free second end portion, and the electrical conductor is clamped between the free first end portion and the free second end portion;
a sensor holder integrally formed as part of the second spring leg;
a spring arm integrally formed as part of the second spring leg; and
a press-on tab integrally formed as part of the spring arm;
wherein a spring force is exerted by the spring arm, such that a sensor which is arranged in the sensor holder is fixed in the sensor holder by way of the press-on tab, and the sensor holder is pressed onto the electrical conductor.

2. The spring clamp of claim 1, further comprising:
a transition region between the first spring leg and the second spring leg;
wherein the sensor holder is arranged between the second end portion of the second spring leg and the transition region.

3. The spring clamp of claim 2, wherein the spring arm is attached in the transition region between the first spring leg and the second spring leg.

4. The spring clamp of claim 1, further comprising:
a plurality of upright arms integrally formed as part of the sensor holder (24), and the sensor holder is a U-shaped sensor holder;
wherein the upright arms of the U-shaped sensor holder face away from the second end portion of the second spring leg.

5. The spring clamp of claim 4, wherein the end regions of the upright arms of the U-shaped sensor holder are upturned or folded.

6. The spring clamp of one of claim 1, wherein the spring force of the spring arm acts in a direction perpendicular to a plug-in direction of the electrical conductor through the receiving opening.

7. The spring clamp of claim 1, further comprising:
a plurality of longitudinal struts spaced apart from one another;
wherein the second end portion of the second spring leg is attached to the first spring leg by the plurality of longitudinal struts.

8. The spring clamp of claim 7, wherein at least one of the spring arm or the sensor holder are formed between the two longitudinal struts.

9. The spring clamp of claim 1, wherein the spring clamp is formed in one piece.

10. The spring clamp of claim 1, wherein the spring clamp is formed as a stamped and bent part.

11. A method for using a spring clamp for arranging on an electrical conductor of an electric machine, comprising the steps of:
providing a spring clamp;
providing a first spring leg;
providing a second spring leg adjoining the first spring leg, the first spring leg and the second spring leg being part of the spring clamp;
providing a receiving opening being part of the spring clamp;
providing a temperature sensor;
plugging the spring clamp onto the conductor end of the electrical conductor by way of the receiving opening, such that the electrical conductor is clamped thereto, with the result that a conductor end of the electrical conductor is arranged between the first spring leg and the second spring leg at least in certain portions;
arranging the temperature sensor in the sensor holder such that the sensor holder is pressed onto the electrical conductor.

12. An electric machine having a stator, comprising:
at least one electrical conductor being part of the stator;
a spring clamp plugged on a conductor end of the at least one electrical conductor and clamped to the conductor end, the spring clamp further comprising:
a first spring leg;
a free first end portion integrally formed as part of the first spring leg;
a second spring leg adjoining the first spring leg;
a free second end portion integrally formed as part of the second spring leg;
a receiving opening for receiving the electrical conductor, and the first spring leg and the second spring leg are arranged with respect to one another in such a way that the receiving opening is formed between the free first end portion and the free second end portion, and the electrical conductor is clamped between the first end portion and the second end portion;
a sensor holder integrally formed as part of the second spring leg;
a spring arm integrally formed as part of the second spring leg;
a temperature sensor arranged in the sensor holder and fixed in the sensor holder by way of the spring arm; and
wherein the sensor holder is pressed onto the electrical conductor.

* * * * *